April 15, 1947.    J. W. KARWEIT    2,418,840
HYDRAULIC DRILL PRESS
Filed Nov. 3, 1942    4 Sheets—Sheet 1

INVENTOR.
John W. Karweit
BY
HIS ATTORNEY

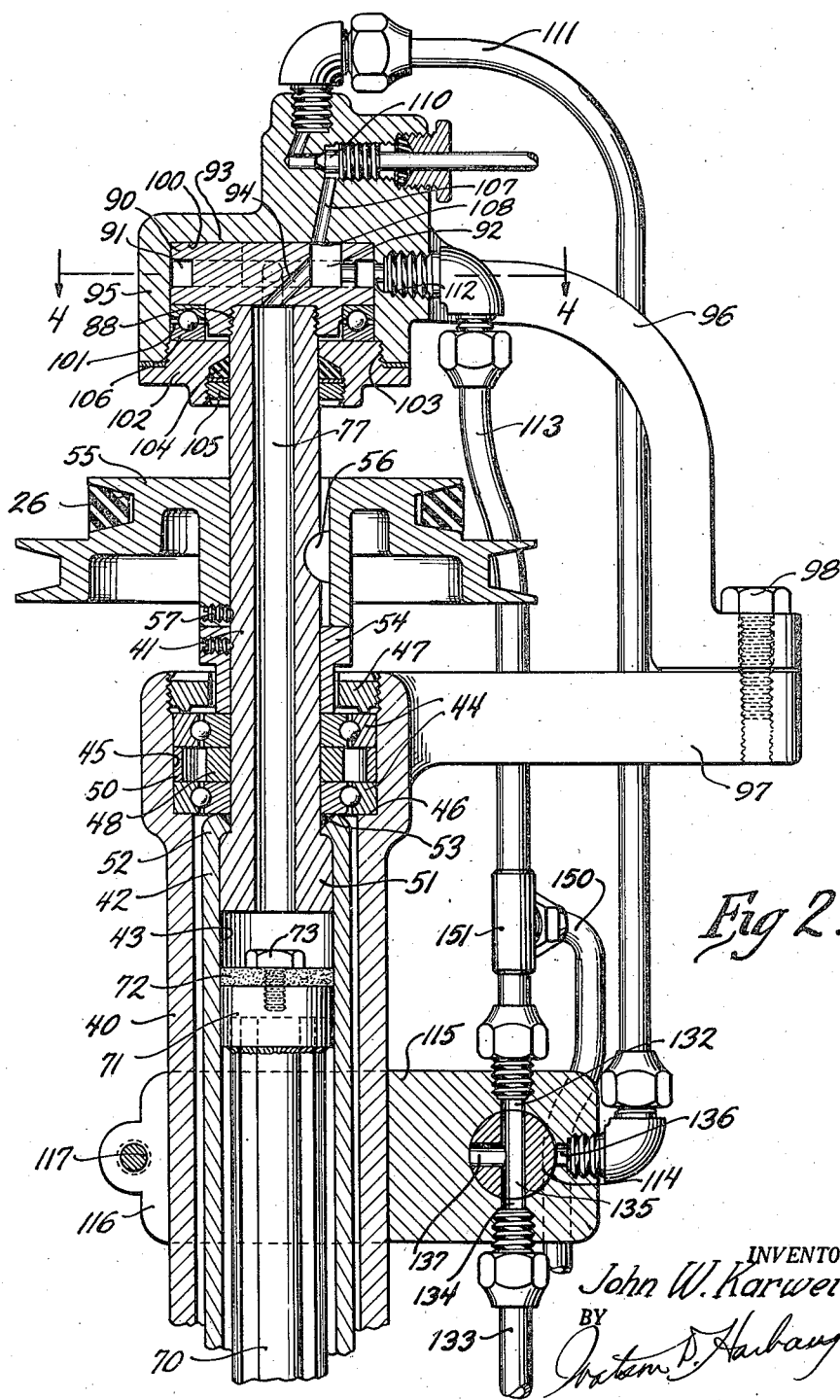

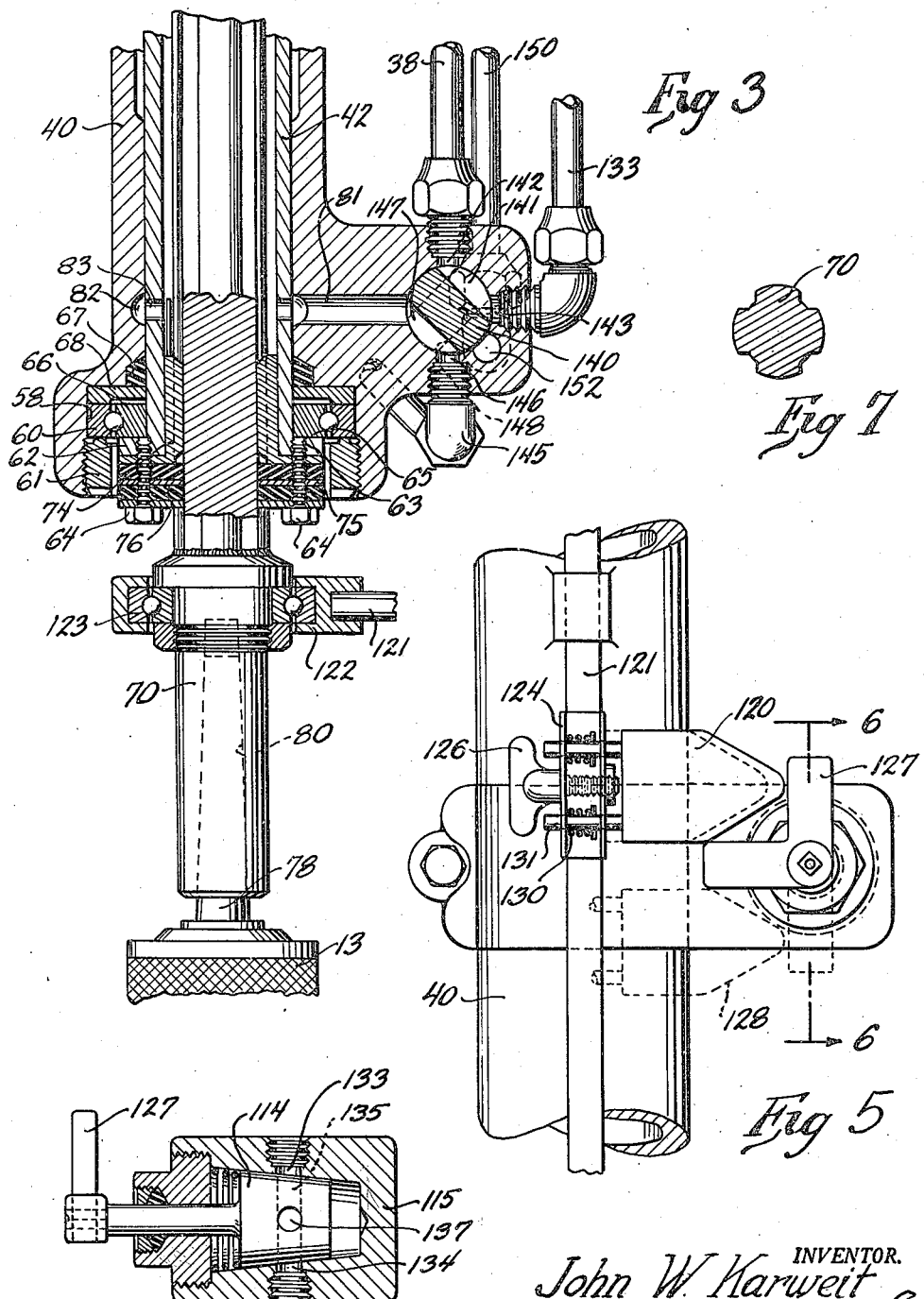

April 15, 1947.      J. W. KARWEIT      2,418,840
HYDRAULIC DRILL PRESS
Filed Nov. 3, 1942      4 Sheets-Sheet 4
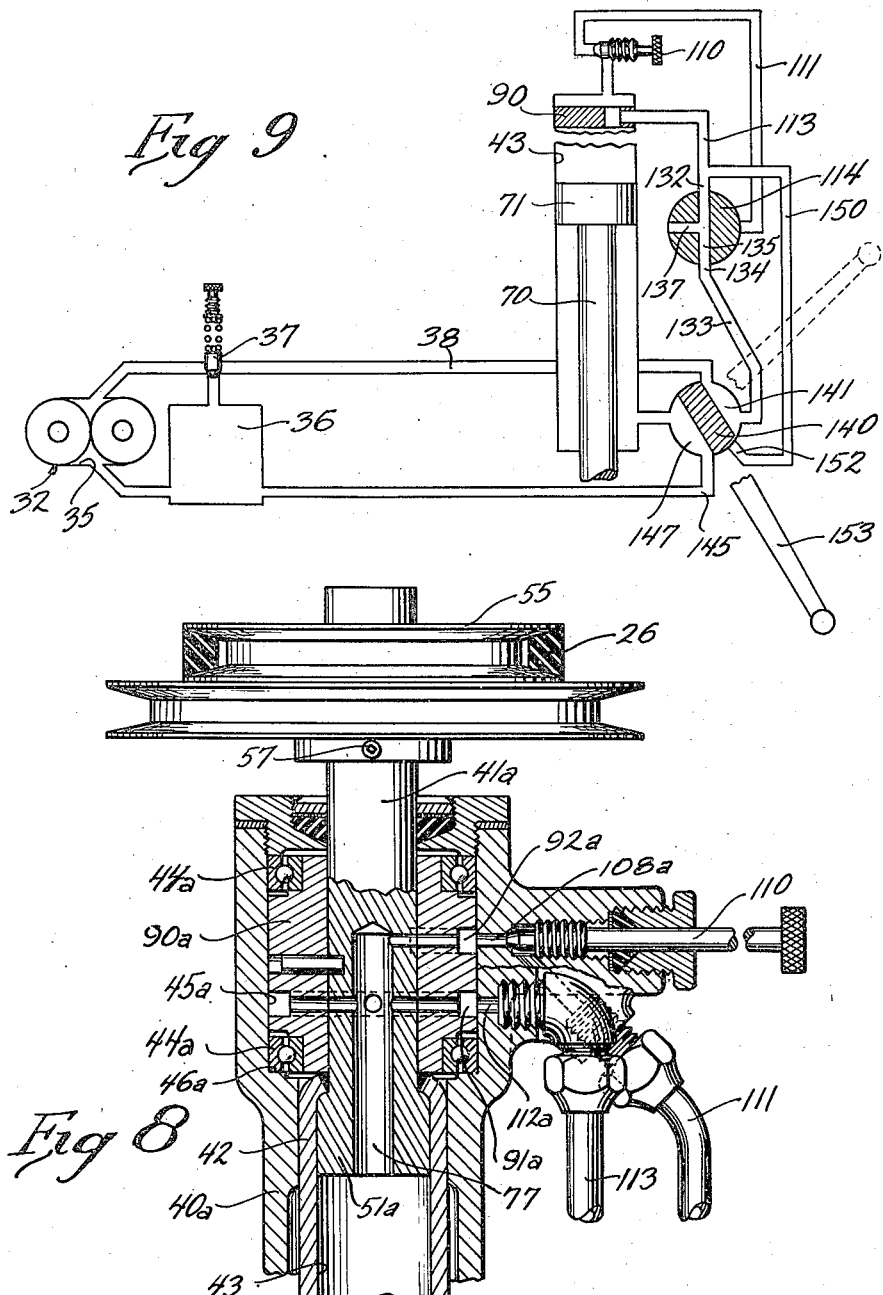
INVENTOR.
John W. Karweit
BY
His Attorney Patented Apr. 15, 1947

2,418,840

UNITED STATES PATENT OFFICE 2,418,840

HYDRAULIC DRILL PRESS

John W. Karweit, Skokie, Ill., assignor, by mesne assignments, to Ex-Cell-O Corporation, Detroit, Mich., a corporation of Michigan Application November 3, 1942, Serial No. 464,340

9 Claims. (Cl. 77—32)

The invention relates to power driven tools and more particularly to drill presses and certain improvements therein adaptable also for use with similar tools.

Aside from questions of expense, it has long been the practice with drill presses or the like to provide a feed arrangement for advancing the drill with which the operator could "feel" the feed. As a general rule, with this arrangement, the operators were so trained that whenever the feed began to feel heavy to them, they would back the drill clear of the work to remove the chips which filled the drill flutes before feeding the drill further.

In some instances, where a drill press was set up to work with one particular metal, and no other metal was to be used, it was possible to dispense with the arrangement for feeling the feed. In fact, one machine drilling only one metal all the time could be automatic. However, where the drill press would be used for a miscellany of work materials, it was necessary that the feel of the drill be provided since, under conventional practices, stringy metals such as copper, aluminum and naval brass would be encountered. Without the feel of the feed, drill breakage would be very high.

Furthermore, even where the feel of the feed is present in a hand-feed drill press or the like, the tool breakage is high, particularly where the press is operated by inexperienced operators, or where a deep cut is to be made and the operator seeks to establish a favorable production record.

In other instances, as where a work piece, such as a carburetor body, is nearing completion great care must be exercised to safeguard against breakage of tools in the work piece that would scrap the piece. In some instances the final cuts are made by hand.

Much time is consumed in performing the operations conventionally, and the danger of drill breakage with deep cuts is always imminent.

In the present invention not only is the prime cause of tool breakage eliminated, namely, the binding of the chips in the drill flutes, as more particularly discussed in my co-pending application Serial No. 455,417, reference to which is hereby made for other and further discussion upon this point, but the present invention also provides an improved drill press or the like, in which the feel of the feed is not essential to the handling of different metals.

Another object of the invention is to provide an improved drill press which is less tiring upon the operator mentally and physically to operate, and can be operated successfully by unskilled as well as skilled operators.

A further object is to provide an improved hand-feed drill press which can be operated manually for special work or semi-automatic for production work.

One of the objects of the present invention is to provide the combination of a rotary drill and a hand forward feed in which the feed traverse effort is a substantially constant factor.

Another object of the invention is to provide an improved drill press which amateurs may use, who are unskilled mechanically, with little fear of drill breakage during deep cuts of a stringy metal or metals and in which the feed traverse effort can be adjusted and maintained constant.

A further object of the invention is to provide a drill press or the like whose feed traverse characteristics may be varied manually or automatically.

A further object of the invention is to provide a feed arrangement for a drill press where the rate of feed can be kept uniform automatically at any one of a plurality of feed rates, depending upon the size of cut being made.

Another object is to provide a drilling process for stringy metals or the like in which a single feed traverse is limited only by the length of the flutes upon the drill.

Another object of the invention is to provide a device of the class described which is simple in construction and operation, and inexpensive to manufacture and maintain.

These being among the objects of the invention, other and further objects will become apparent from the drawings, the description relating thereto and the appended claims.

Referring now to the drawings:

Fig. 2 is an enlarged vertical section of the upper portion of the drill head shown in Fig. 1;

Fig. 3 is an enlarged vertical section of the lower portion of the drill head shown in Fig. 1;

Fig. 5 is an enlarged side elevation of the rapid forward and feed traverse control;

Fig. 6 is a section taken upon the line 6—6 in Fig. 5;

Fig. 7 is a cross section of the spindle indicating the drive relationship provided between the sleeve and spindle;

Fig. 8 is a restricted view similar to Fig. 2 illustrating a preferred embodiment of certain features of the invention; and Fig. 9 is a diagrammatical view of the hydraulic system employed in the invention.

Figures 1, 4:
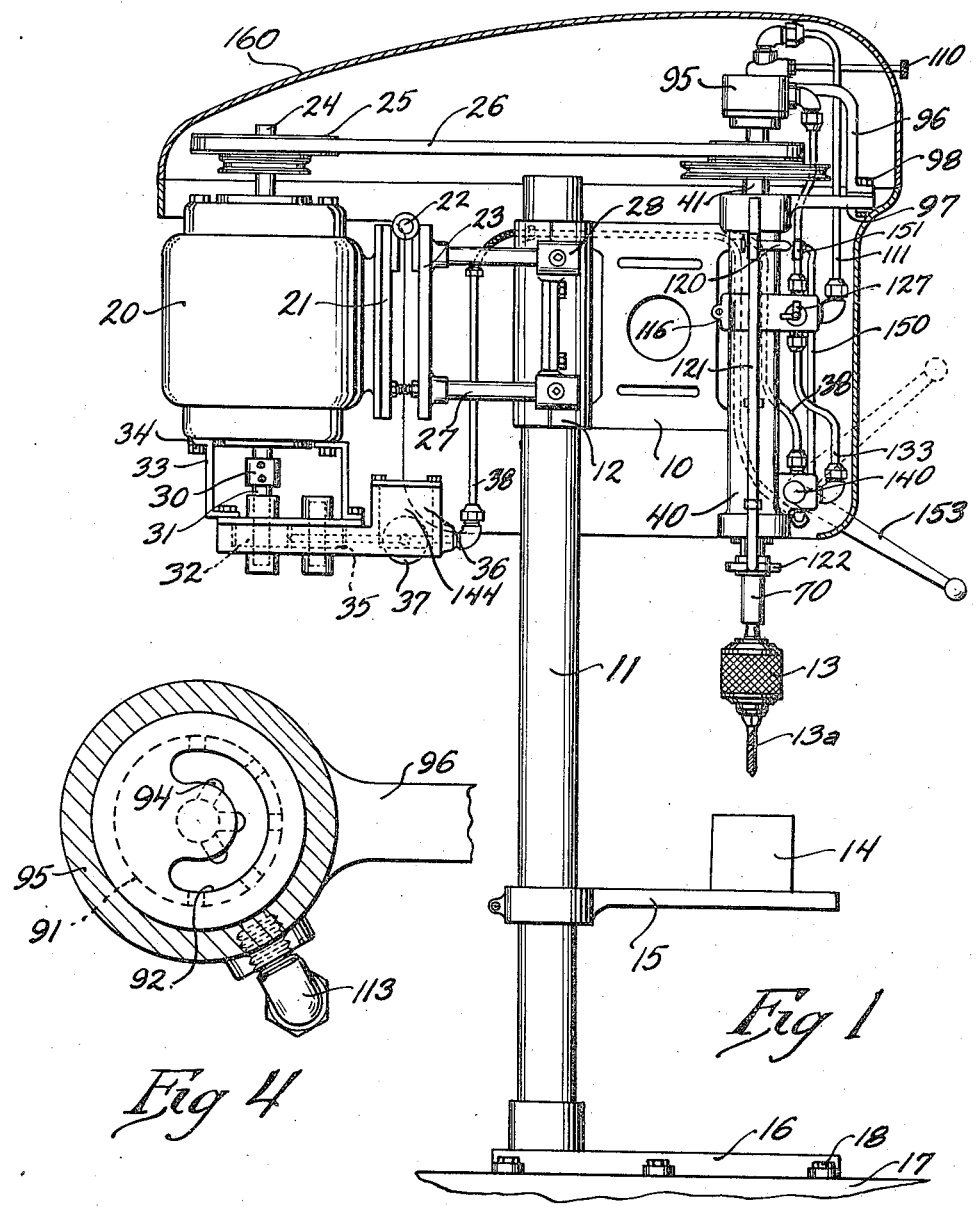
Fig. 1 is a side elevation of a drill press illustrating one of the embodiments of the invention.
Fig. 4 is a section taken upon the line 4—4 in Fig. 2.

In the practice of my invention, I prefer to provide a construction wherein a hydraulic medium is employed to control the feed characteristics during a drilling operation. This feed characteristic is preferably one in which a drill is fed a short distance each revolution and permitted to dwell at the end of its feed position over the remaining portion of its revolution. Thus, the chip which was formed during the feed movement and part of a rotation is broken away during the remainder of said rotation to a size which will clear the flute readily without any binding or scoring of the walls.

Referring now to the drawings in further detail, the drill press head 10 is slidably mounted in locked relation upon a standard 11 by means of a split sleeve arrangement 12 so that a drill chuck 13 may be suitably located with respect to a work piece 14 disposed upon the work table 15. Standard 11, in turn, is supported upon a base 16 secured to a floor or table 17 by bolts 18.

As viewed in Fig. 1, a motor 20 is mounted to the left of the standard 11 upon a base member 21 which is pivoted as at 22 to an adjustable carrier 23. The drive shaft 24 of the motor is preferably disposed vertically and carries a pulley 25 that receives and drives a V belt 26. The carrier 23 is provided with rod supports 27 slidably received in collars 28 by which the tension upon the V belt 26 may be adjusted, and the pivot 22 permits the motor to be pivoted about a horizontal axis to release the belt in event the belt is to be shifted to any other groove upon the pulley 25 than that shown.

The shaft 24 of the motor extends beyond the motor housing at both ends and at its lower end receives a drive coupling 30 by which the drive shaft of a hydraulic pump 32 is driven. The pump 32 is mounted by brackets 33 and bolts 34 to the lower part of the pump casing and comprises a pump compartment 35, a sump 36 and a pressure relief valve 37 by which the hydraulic fluid present in the pressure line 38 is maintained at a constant pressure, the pressure relief valve 37 being adjustably set to relieve the line 38 to the sump above the fluid supply and pressure needed to feed any particular drill into the work piece 14. Upon the right hand side of the support 11 the head 10 is provided with a cored enlargement 40 machined to receive the working parts that will now be described.

Within the cored enlargement 40 a hollow shaft 41 is journalled which carries at the lower end thereof a sleeve 42, the inner surface 43 of which constitutes a pressure cylinder. The journalling of the shaft 41 is accomplished by means of a pair of preloaded frictionless bearings 44 held in place in a suitable bearing cavity 45 against a shoulder 46 by a jam nut 47 threaded into the outer end of the cavity. Preloading of the bearings is accomplished by the spacer 48 between the inner races being slightly wider than the spacer 50 between the outer races. The jam nut 47 and shoulder 46 cooperate to tighten the outer races against the outer sleeve 50 to load the bearing members.

The lower end of the shaft 41 has an enlargement 51 thereon received within the upper end of the sleeve 42. The upper rim of the sleeve 42 is upset as at 52 around the inner shoulder of the head 51 where it is brazed as at 53 to the reduced portion of the shaft 41 beyond the head 51 to provide a shoulder against which rests the inner race of the lower one of the two bearings 44.

With this arrangement upward thrusts exerted by the sleeve 42 are borne by the jam nut 47 while downward thrusts of the sleeve 42 are borne by a set screw collar 54 locked to the shaft 41 and resting against the inner race of the upper one of the two bearings 44. A driven pulley 55 is secured to the shaft 41 above the collar 54 by means of a Woodruff key 56 and a set screw 57.

At its lower end the sleeve 42 is journalled in the bearing cavity 58 by means of a frictionless bearing 60 held in place by a bearing retainer 61 threaded into the lower end of the enlargement 40. The lower end of the member 42 is flanged outwardly as at 62 and tapped longitudinally as at 63 to receive the ends of the bolts 64. The included shoulder 65 of the flange rests against the inner race 66 of the bearing 60 and a seal 67 is disposed between the enlargement 40 and the sleeve 42 as held in place by a gland washer 68 assembled ahead of the outer race of the bearing 60.

A driven shaft 70 having a splined outer face, as sectionally shown in Fig. 7, is received in the cylinder 43 of the sleeve 42 where it is supported at the upper end by a piston head 71 having a seal 72 on the top thereof held in place by a bolt 73. The rotary drive between the sleeve 42 and the shaft 70 is accomplished at the lower end of the sleeve 42 by means of splined female runner 74 for the shaft 70 locked in place by the bolts 64 with alternate washers 75 and seals 76 held in place around and in the splines of the shaft 70 where the shaft 70 extends beyond the runner 74.

With this arrangement, whenever a hydraulic fluid under pressure is supplied to the cylinder 43 through a bore 77 provided for that purpose longitudinally through the shaft 41, the shaft 70 is forced downwardly to provide a forward or feed traverse for the chuck 13 that is supported conventionally on the lower end of the shaft 70 by means of a shank 78 received in a taper 80. Reverse or return traverse of the shaft 70 is accomplished by applying hydraulic fluid pressure to the cylinder 43 below the head 71 as by a passageway 81 drilled through the enlargement 40 of the head 10 to a recess 82 in the inner wall from whence the fluid reaches the interior of the sleeve 42 through perforations 83 provided in the side wall thereof where they register with the groove 82.

With the description thus far, it will be understood how the drill chuck 13 and drill 13a is rotated by the motor 20 through the belt 26 and raised and lowered bodily by means of alternately applying the hydraulic fluid pressure developed by the pump 32 above and below the piston 71 in the cylinder 43.

The control of the piston will now be descirbed:

Referring to Fig. 2, the upper end of the shaft 41 has secured thereto, as by threading 88, a rotary valve member 90 having a circumferential groove 91 therein and, as more particularly shown in Fig. 4, an arcuate port 92 in its upper face 93. The port 92 and the groove 91 are in communication with the cylinder 43 through bores 94 opening into the bore 77. The rotary valve 90 is received in a valve housing 95, secured to the head 10 by means of an integral arm 96 held in place upon an extension 97 of the enlargement 40 by means of bolts 98.

The face 93 of the valve member 90 is held in contact with a face 100 in the valve compartment 101 by means of a retainer 102 threaded into the lower opening as at 103 of the valve compartment. The retainer 102 carries a packing seal 104 resting against the outer surface of the shaft 41 as held in place by a gland nut 105. The upper face of the valve nut 102 supports one race of a frictionless bearing 106, the other race of which carries the rotary valve member 90.

Through the valve housing 95 a passageway 107 is drilled to open upon the face 93 at a port 108 which registers with the port 92 in the rotary member. The flow of hydraulic fluid through the passageway 107 is controlled by means of a needle valve 110 as supplied with hydraulic fluid under pressure from the line 111. With this arrangement of the ports 92 and 108, the supply of hydraulic fluid to the cylinder 43 is intermittent in quantities controlled by the needle valve 110. More specifically, each time the chuck and drill 13 revolve the ports 92 and 108 are in communication with each other throughout a portion of the rotation, and out of communication with each other throughout the remaining portion of relative rotation. Hydraulic fluid is supplied to the chamber 43 in quantities metered by the needle valve 110 during the time the ports 92 and 108 are in communication with each other, and this supply is interrupted when the ports 92 and 108 are moved to relative positions out of communication with each other. With this control, the drill is alternatively fed into the work to cut some metal and then held at the end of that feed to break the chip thus cut before being fed further through a series of successively identical steps timed in relationship to the rotation of the drill in the work.

Hydraulic fluid under pressure may also be supplied to the cylinder 43 above the head 71 through a groove 91 which is in continuous registration with an opening 112 to receive fluid from the line 113. In this way, by selecting which of the two conduits 111 or 113 is to supply hydraulic fluid to the cylinder 43, the piston 71 may be alternatively subjected to a metered intermittent flow or an uninterrupted flow. This selection is made by means of a valve 114 located in a valve housing 115 fastened to the head 10 as by a split collar 116 and a bolt 117.

It is preferred that the valve 114 be controlled automatically and adjustably in relationship to the position of the piston 71 in the cylinder 43, the valve being disposed to provide an uninterrupted flow to the cylinder 43 to provide a rapid forward traverse until the feed traverse station is reached, at which time the intermittent metered supply of hydraulic liquid is substituted to provide the feed traverse and chip breaking action just described.

This transition from the rapid forward traverse to the feed traverse is accomplished by means of a dog 120 adjustably mounted upon a shaft 121 carried by the rotary shaft 70 by means of a collar 122 held in place by a frictionless bearing 123. The dog 120 is mounted upon the shaft 121 for vertical adjustment by means of a slider 124 which can be clamped in place by a winged nut 126.

For purposes of actuating the valve by vertical movement of the dog 120 an L-shaped arm 127 is mounted upon the outer end of the valve 114 with one of the arms being engaged by and moved by the dog 120 when the dog moves downwardly to the position shown in phantom 128, and the other of the arms being engaged by the dog 120 when the dog is moved from its position 128 to its full line position as shown in Fig. 5. As the dog 120 moves downwardly, it yields inwardly, supported by springs 130, to the degree necessary to clear with close contact the arm 127. Pins 131 are provided to support the dog 120 in sliding relationship with respect to the follower 124 to provide for the yield described.

In the position of the valve shown in Fig. 2 the valve is the same as that shown in Fig. 5 wherein the port 132 leading to the line 113 is in communication through the valve passageway 135 with a fluid supply line 133 and its port 134. In this position the piston 71 is moved downwardly by a constant and uninterrupted supply of hydraulic fluid under pressure in the supply line 133 until such time as the dog 120 contacts the arm 127 to move the valve to its alternative position in which the valve port 136, communicating with the line 111, is placed in communication with the passageway 135 and the port 134 through the T passage 137 in the valve 114. In this position the piston 71 is subjected to the intermittent metered feed provided when the cylinder 43 is connected to the line 111, as described.

The operator controls the supply of hydraulic fluid to the conduit 133 by means of a two-position valve 140. As more particularly shown in Fig. 3, the pressure line 38 is placed in communication with the supply line 133 through a slot 141 cut in one side of the valve 140 where it will register with the ports 142 and 143 for the lines 38 and 133 respectively.

The line leading back to the sump 36 is indicated at 145 and in the position of the valve shown in Fig. 3 the space in the cylinder 43 below the piston 71 is placed in communication with the sump line 145 through the port 146 by means of a slot 147 upon the other side of the valve which establishes communication between the lines 81 and 145.

After the rapid forward traverse has been accomplished and the feed traverse allowed to proceed until the drill cuts to a suitable depth, the valve 140 is rotated counter-clockwise to the position shown in phantom 148 in which the port 142 of the pressure line 38 is placed in communication with the cylinder below the piston through the line 81 to force the piston upwardly and provide a rapid reverse traverse for the drill, and the cylinder 43 above the piston 71 is drained back to the sump by the port 143 and the supply line 133 being placed in communication with the port 146 leading to the sump line 145.

However, since upon the reverse stroke of the piston 71 the cylinder 43 above the piston is still in communication with the supply line 133 through the needle valve 110, I provide a by-pass for the valve 114 in the form of a conduit 150 connected to the conduit 113 by means of a T fitting 151. The other end of the conduit 150 is adapted to be placed in open communication with the sump line 145 through a bore 152 cooperating for that purpose with the valve slot 141.

The position of the valve 140 is determined selectively by the operator by means of a handle 153, the construction and the movement of the handle being so correlated that forward traverse and feed movement of the drill is established when the handle is moved downward and the reverse traverse of the drill is accomplished when the handle is moved upwardly. The valve 140 closes the bore 152 when the handle is in its down position, thereby permitting the valve 114 to function in the manner described.

The valve 114 and dog 120 are further constructed and arranged so that when it is desirable to feed the drill into the work without benefit of the metered intermittent supply of fluid, it can be done by the dog 120 being removed from a position actuating the valve 114. Manipulation of the handle 153 is then relied upon to regulate or meter the fluid supply through the port 143 to the supply line 132 and the line 113. In this way, the device not only can be used to drill with a chip breaking action, but also can be used as any other standard drill.

On the other hand, by incorporating another dog 120 upon the shaft 121 to actuate the valve 140 at the lower limit of the feed, the drill press can be made to operate fully automatically after a forward traverse is initiated. With this arrangement (not shown) the second dog 120 would move the valve 140 from its forward traverse position, as shown in Fig. 3, to its alternate reverse position, shown in phantom 148, it being understood that suitable feed limit stops could be provided or arranged to determine the depth to which the drill is fed into the work 14.

Referring to Fig. 8, an embodiment of the rotary valve is shown in which the valve is disposed within the head enlargement 40 so that the belt 26 can be removed and replaced readily. In this construction the rotary valve member 90a is secured to the shaft 41a between the bearings 44a with the ports 108a and 112a opening upon the inner face of the combined bearing cavity, and valve chamber 45a where they register with the circumferential port 92a and groove 91a respectively. Otherwise, like numbers refer to like parts throughout the several views.

*Operation*

Presupposing that the motor 20 is rotating with the handle 153 disposed in its upper position, a pressure is built up in the pressure line 38 to the degree determined by the relief valve 37 and hydraulic pressure is applied to the cylinder 43 below the piston 71, where the drill and drill chuck 13 are held at their upper or retracted limit. Then, when the handle 153 is moved to its downward position, pressure in the line 138 is supplied in full measure to the cylinder 43 through the supply line 133, line 113, valve conduit 135, and groove 91 to provide a rapid forward traverse for the drill 13a until the dog 120 contacts the arm 127 and moves the valve 114 to its alternate position in which the fluid supplied by the supply line 133 is applied through the conduit 111 to the cylinder 43 as metered by the needle valve 110 and interrupter valve 90. In event the drill 13a is of small diameter the metering valve 110 is adjusted to a minimum flow, whereas if the drill in the chuck 13 is of large diameter the valve 110 is adjusted to increase the flow, the valve being operated by a handle extending beyond the casing 160 employed to shield the parts from damage.

After the piston 71 has been fed forward to carry the drill to the proper depth, the handle 153 is raised manually or automatically to its upper position, at which time the cylinder 43 above the piston is placed in communication with the sump through the conduit 113 and by-pass 150. Fluid under pressure is supplied below the piston 71 through the conduit 81 to force the piston upwardly.

The reverse traverse will be faster than the rapid forward traverse since the displacement of the piston 71 is greater for the same amount of fluid below the piston as compared with the same amount of fluid above the piston, the piston in other words constituting a differential arrangement.

Whenever the valve 114 is left in the position shown in Fig. 9 and Fig. 2, as by removing the dog 120 from a position actuating the arm 127, the feed movement of the drill is controlled by the handle 153, same being a smooth forward feed and a smooth reverse traverse, the speed of which is regulated by the degree of communication permitted by the valve 140 between the respective ports in relationship to the position of the handle.

Having thus described the invention, the manner in which the objects are accomplished will be understood more clearly when it is noted that with the present invention, regardless of the metal being cut by the drill, all the chips come out a uniform size, a size that can be determined by the length of the arcuate ports 92 or 92a, and the degree of feed permitted to exist by the adjustment of the valve 110, it being possible with this arrangement to provide chips small enough to readily clear the flutes in the drill and be handled thereafter in much the same manner that one would handle sand, as distinguished from long curls and stringy chips that would otherwise bind in the drill and cause drill breakage.

Consequently, although certain embodiments of the invention have been shown and described therein, it will be apparent to those skilled in the art that other and various modications of the invention may be made without departing from the spirit of the invention, the scope of which is commensurate with the appended claims.

What is claimed is:

1. A drill press having a head and a work table, a plurality of axially aligned shafts, means for moving said shafts longitudinally with respect to each other including a cylinder upon one shaft and a piston carried by the other shaft disposed in the cylinder, means for rotating the shafts simultaneously, means for mounting a drill on one of the shafts, means for introducing fluid under pressure into said cylinder for moving one shaft longitudinally with respect to the other, and means driven by one of said shafts for intermittently interrupting the supply of fluid under pressure to said cylinder.

2. A drill press having a head and a work table, a plurality of axially aligned shafts, means for moving said shafts longitudinally with respect to each other including a cylinder upon one shaft and a piston carried by the other shaft disposed in the cylinder, means for rotating the shafts simultaneously, means for mounting a drill on one of the shafts, means for introducing fluid under pressure into said cylinder for longitudinally moving one shaft with respect to the other, and means driven by one of said shafts for intermittently interrupting the supply of fluid under pressure to said cylinder and including a flow metering valve.

3. A drill press having a head and a work table, a plurality of axially aligned shafts, means for moving said shafts longitudinally with respect to each other including a cylinder upon one shaft and a piston carried by the other shaft disposed in the cylinder, means for rotating the shafts simultaneously, means for mounting a drill on one of the shafts, means for introducing fluid under pressure into said cylinder for moving one shaft with respect to the other, and means driven from one of said shafts for intermittently interrupting the supply of fluid under pressure to said cylinder and including a flow interrupter valve.

4. A drill press having a head and a work table, a plurality of axially aligned shafts, means for moving said shafts longitudinally with respect to each other including a cylinder upon one shaft and a piston carried by the other shaft disposed in the cylinder, means for rotating the shafts simultaneously, means for mounting a drill on one of the shafts, means for introducing hydraulic fluid under pressure into said cylinder for moving one shaft with respect to the other, and means driven by one of said shafts for intermittently interrupting the supply of fluid under pressure to said cylinder once each revolution and including a flow interrupting valve and a flow metering device.

5. A drill press having a head and a work table, the combination of a plurality of axially aligned shafts journalled in the head, means for reciprocating said shafts with respect to each other including a cylinder upon one shaft and a piston carried by the other shaft disposed in the cylinder, means for rotating the shafts simultaneously, means for connecting a drill to one of the shafts, means for introducing fluid under pressure in said cylinder for moving one shaft with respect to a work piece, and means driven by one of said shafts for intermittently interrupting the supply of fluid under pressure to said cylinder after the said one shaft has approached to within a predetermined distance of a work table.

6. A drill press having a head and a work table, the combination of a plurality of axially aligned shafts journalled in the head, means for reciprocating said shafts with respect to each other including a cylinder upon one shaft and a piston carried by the other shaft disposed in the cylinder, means for rotating the shafts simultaneously, means for connecting a drill to one of the shafts, means for introducing fluid under pressure in said cylinder for moving said one shaft with respect to a work piece, and means driven in stepped relationship with one of said shafts for intermittently interrupting the supply of fluid under pressure to said cylinder approximately once each revolution after the said one shaft has approached to within a predetermined distance of a work table, and means for by-passing said driven means when said one shaft is moved away from the work table.

7. In a drill press having a head and a work table, the combination of a plurality of axially aligned elements, means for reciprocating said elements with respect to each other including a cylinder upon one element and a piston carried by the other element disposed in the cylinder, means for rotating one of the elements, means for connecting a drill to said one of the elements, means for introducing fluid under pressure in said cylinder for traversing said one element towards said work table, and means driven in stepped relationship with said one element for intermittently interrupting the supply of fluid under pressure to said cylinder.

8. In a drill press having a head and a work table, the combination of a plurality of axially aligned elements, means for reciprocating said elements with respect to each other including a cylinder upon one element and a piston carried by the other element disposed in the cylinder, means for rotating one of the elements, means for connecting a drill to said one of the elements, means for introducing fluid under pressure in said cylinder for traversing said one element towards said work table at a rapid forward traverse, and means driven in stepped relationship with said one element for traversing said one element at a feed traverse following said rapid forward traverse including a device intermittently interrupting the supply of fluid under pressure to said cylinder approximately once each revolution.

9. In a device of the class described for drilling a work piece, the combination of a housing, a driven shaft, said driven shaft comprising two members journalled in the housing and movable axially with respect to each other, a hydraulic element for moving said two members axially with respect to each other, means controlled by one of said members for controlling said element to remove it from its operation of moving said members axially with respect to each other in stepped relationship with the rotation of said members during rotation, and a drill carried by one of said members for drilling the work piece.

JOHN W. KARWEIT.

REFERENCES CITED

The following references are of record in the file of this patent:

UNITED STATES PATENTS

| Number | Name | Date |
|---|---|---|
| 92,419 | Bates | July 13, 1869 |
| 1,085,146 | McClellan | Jan. 27, 1914 |
| 1,911,132 | Macomber | May 23, 1933 |
| 1,978,879 | Ferris et al. | Oct. 30, 1934 |
| 1,046,311 | Lassiter et al. | Dec. 3, 1912 |
| 1,759,412 | Noble | May 20, 1930 |